US008266423B2

(12) United States Patent
Giraud et al.

(10) Patent No.: US 8,266,423 B2
(45) Date of Patent: Sep. 11, 2012

(54) PROTECTION AGAINST ATTACKS BY GENERATION OF ERRORS ON JUMP INSTRUCTIONS

(75) Inventors: Christophe Giraud, Pessac (FR); Hugues Thiebeauld De La Crouee, Bordeaux (FR)

(73) Assignee: Oberthur Technologies, Levallois-Perret (FR)

( * ) Notice: Subject to any disclaimer, the term of this patent is extended or adjusted under 35 U.S.C. 154(b) by 1124 days.

(21) Appl. No.: 11/665,991

(22) PCT Filed: Oct. 18, 2005

(86) PCT No.: PCT/FR2005/002582
§ 371 (c)(1),
(2), (4) Date: Jun. 26, 2007

(87) PCT Pub. No.: WO2006/045924
PCT Pub. Date: May 4, 2006

(65) Prior Publication Data
US 2007/0250703 A1    Oct. 25, 2007

(30) Foreign Application Priority Data

Oct. 22, 2004   (FR) ..................................... 04 11317

(51) Int. Cl.
*G06F 21/00* (2006.01)
(52) U.S. Cl. ............ 713/152; 705/51; 705/52; 709/229; 726/22
(58) Field of Classification Search .................. 713/152
See application file for complete search history.

(56) References Cited

U.S. PATENT DOCUMENTS

| 5,349,655 | A  | * | 9/1994 | Mann ............................ 714/6.31 |
| 6,108,797 | A  |   | 8/2000 | Lin et al. |
| 6,272,637 | B1 | * | 8/2001 | Little et al. .................... 713/194 |
| 7,716,459 | B2 | * | 5/2010 | Elias et al. .................... 712/234 |
| 2003/0101351 | A1 | * | 5/2003 | Liardet ......................... 713/194 |
| 2003/0182572 | A1 | * | 9/2003 | Cowan et al. ................. 713/200 |

OTHER PUBLICATIONS

Authors: Ghassem Miremadi and Jan Torin,Member IEEE; Article: Evaluating Processor-Behavior and Three Error-DetectionMechanisms Using Physical Fault-Injection (pp. 441-454); IEEE Transactions on Reliability, vol. 44, No. 3, Sep. 1995; URL:http://ieeexplore.ieee.org/stamp/stamp.jsp?arnumber=00406580.*

(Continued)

*Primary Examiner* — Taghi Arani
*Assistant Examiner* — Mahfuzur Rahman
(74) *Attorney, Agent, or Firm* — Young & Thompson

(57) ABSTRACT

A method for securing a program against attacks by error, i.e. in a chip card, wherein at least one jump instruction, including a relative address chosen from a plurality of possible relative addresses, is identified in the program, wherein the at least one jump instruction makes it possible to reach a targeted address inside the memory area extending before and after the jump instruction and regrouping the plurality of possible relative addresses, inside the memory area, wherein an instruction to be preserved is identified and, in order to secure at least the instruction, at least one first non-operative batch including at least one instruction is inserted, the insertion being carried out in such a way as to ensure that the insertion is compatible with maintenance of the address targeted by the jump instruction inside the memory area and that the insertion is compatible with the normal running of the program.

49 Claims, 9 Drawing Sheets

```
┌── Instr. to protect
│
│  ←─Non-operative batch
│
├─Jump + address
│
│
└
```

OTHER PUBLICATIONS

Defending Browsers against Drive-by Downloads: Mitigating Heap-spraying Code Injection Attacks|http://www.cs.ucsb.edu/~chris/research/doc/dimva09_heapspray.pdf|Manuel Egele1|pp. 1-19.*

Hagai Bar-El et al: The Sorcerer's Apprentice Guides to Fault Attacks 'Online! May 7, 2004, XP002329915 Retrieved from the Internet: URL: http://web.archive.org/web/20041016071838/eprint.iacr.org/2004/100>'retrieved on May 27, 2005! the whole document.

Kanzaki Y et al: 'Exploiting self-modification mechanism for program protection Nov. 3, 2003, Proceedings of the 27$^{TH}$. Annual International Computer Software and Applications Conference. COMPSAC 2003. Dallas, TX, Nov. 3-6, 2003, Annual International Computer Software and Applications Conferenc, Los Alamitos, CA, IEEE Comp. Soc, US, p. (S), XP010669091 ISBN: 0-7695-2020-1 figures 11, 13.

A. Monden et al: "Obfuscated Instructions for Software Protection" 'Online! Nov. 2003, XP002329913 ISSN: 0919-9527 Retrieved fro the Internet: URL:http://www.cs.auckland.ac.nz/{cthombor/Pubs/2003013.pdf> retrieved on May 30, 2005! figure 11.

Prof. Jean-Jacques Quisquater: "Side channel attacks—State-or-the-art" 'Online! Oct. 2002, XP002329914 Retrieved from the Internet: URL:http://www.ipa.go.jp/security/enc/CRYPTREC/fy15/doc/1047_Side_Channel_report.pdf> retrieved on May 27, 2005! section 10.2-section 10.2.2.

Cohen F B: "Oerating System Protection Through Program Eveolution" Computers & Security, Elsevier Science Publishers. Amsterdam, NL, vol. 12, No. 6, Oct. 1, 1993, pp. 565-584, XP000415701 ISSN: 0167-4048 the whole document.

* cited by examiner

; position of the instruction which, once compiled, will be located at
; the address of the jump -127 bytes
....

call call1          ; instruction hazardous if executed at an unintended time
....
inc a               ; instruction hazardous if executed at an unintended time
....                ; any instructions
and test1,test2
jz label            ; jump instruction
call call2
label :
call call3
ret
......              ; instructions including a jump, a call or a ret
call call4          ; instruction hazardous if executed at an unintended time
....
; position of the instruction which, once compiled, will be located at
; the address of the jump +127 bytes

Figure 9

```
call call1        ; instruction hazardous if executed at an unintended time
....
inc a             ; instruction hazardous if executed at an unintended time ; position of the instruction which, once compiled, will be located at
; the address of the jump -127 bytes nop               ; non-operative instruction
....              ;****any instructions ***
nop               ; non-operative instruction
nop               ; non-operative instruction
nop               ; non-operative instruction
inc b             ; non-operative instruction. Has no effect on the
                  ; result of execution in combination with dec b
dec b             ; non-operative instruction. Has no effect on the
                  ; result of execution in combination with inc b
inc R2            ; non-operative instruction. Has no effect on the
                  ; result of execution on its own because the register R2
                  ; is not used in normal execution of the program.
and test1,test2
jz label          ; jump instruction
call call2
label :
nop               ; non-operative instruction
call call3        ; instruction hazardous if executed at an unintended time
ret
nop               ; non-operative instruction
nop               ; non-operative instruction
nop               ; non-operative instruction
inc b             ; non-operative instruction
dec b             ; non-operative instruction ; instructions including for example a jump, a call or a ret
; position of the instruction which, once compiled, will be located at
; the address of the jump +127 bytes call call4        ; instruction hazardous if executed at an unintended time
....
```

Figure 10

; position of the instruction which, once compiled, will be located at
; the address of the jump -127 bytes ....
and test1,test2
jz label1
call call2

....
jmp label2          ; jump instruction concerned
label1 :
call call4

....
label2 :
call call5          ; instruction hazardous if executed at an unintended time
ret ....
call call1          ; instruction hazardous if executed at an unintended time ....
inc a               ; instruction hazardous if executed at an unintended time ....
ret ....
; position of the instruction which, once compiled, will be located at
; the address of the jump +127 bytes figure 11

; position of the instruction which, once compiled, will be located at
; the address of the jump -127 bytes

....

and test1,test2
jz label1
call call2

....

jmp label2            ; jump instruction concerned
label1 :
call call4
                      ; instruction without jump, or return, or method call
label2 :
call call5
ret
jmp label2            ; non-operative instruction. Has no effect
                      ; on the result of execution in combination
                      ; with ret a because of the ret, no pass on
                      ; this instruction in normal operation
jmp label2            ; idem preceding instruction
nop
nop
nop
mov a,b               ; set of non-operative instructions. Has no effect on the
xor a,b               ; result of execution because b is not used in the program.
jz label3
nop
label3 :
nop                   ; non-operative instruction Call sub_rtn          ; instructions including for example a jump,
                      ; a method call or a return to the calling method ; position of the instruction which, once compiled, will be located at
; the address of the jump +127 bytes

....

call call1            ; instruction hazardous if executed at an unintended time

....

inc a                 ; instruction hazardous if executed at an unintended time

....

ret

Figure 12

```
xor authentication_checksum,#true
            ; if authentication_checksum = false, then an attack is detected jnz label           ; jump instruction call prog_cont      ; continuation of the program and program returns bytes read
                    ; instruction to be protected Label :
call anomaly_processing
            ; a problem is detected, the bytes read are not sent
            ; this instruction sends the program to an action program
```

Figure 13

```
Xor authentication_checksum,#true
                     ; if authentication_checksum = false, then an attack is detected jnz label            ; jump instruction call prog_cont       ; continuation of the program and program returns bytes read
                     ; instruction to be protected inc a                ; non-operative instruction
dec a                ; non-operative instruction
jmp label            ; non-operative instruction of jump type
nop                  ; non-operative instruction
nop                  ; non-operative instruction Label                ; non-operative instruction nop                  ; non-operative instruction
call anomaly_processing
                     ; a problem is detected, the bytes read are not sent
                     ; this instruction sends the program to an action program
                     ; security batch jmp label            ; non-operative instruction of Jump type
jmp label            ; non-operative instruction of Jump type
```

Figure 14

; position of the instruction which, once compiled, will be located at
; the address of the jump -127 bytes nop                  ; non-operative instruction
....
nop                  ; non-operative instruction
Xor authentication_checksum,#true
                     ; if authentication_checksum = false, then an attack is detected
Jnz label            ; jump instruction call prog_cont       ; continuation of the program and program returns bytes read
                     ; instruction to be protected nop                  ; non-operative instruction
inc a                ; non-operative instruction
dec a                ; non-operative instruction
nop                  ; non-operative instruction
nop                  ; non-operative instruction
nop                  ; non-operative instruction
inc a                ; non-operative instruction
dec a                ; non-operative instruction
nop                  ; non-operative instruction
nop                  ; non-operative instruction
nop                  ; non-operative instruction Label                ; non-operative instruction nop                  ; non-operative instruction call anomaly_processing
                     ; a problem is detected, the bytes read are not sent
                     ; this instruction sends the program to an action program
                     ; security batch ; position of the instruction which, once compiled, will be located at
; the address of the jump +127 bytes

Figure 15

Xor authentication_checksum,#true
          ; if authentication_checksum = false, then an attack is detected

| | |
|---|---|
| Jz label | ; jump instruction |
| nop | ; non-operative instruction |
| inc a | ; non-operative instruction |
| dec a | ; non-operative instruction |
| nop | ; non-operative instruction |
| jmp label1 | ; non-operative instruction |
| nop | ; non-operative instruction |
| inc a | ; non-operative instruction |
| dec a | ; non-operative instruction |
| nop | ; non-operative instruction |
| nop | ; non-operative instruction |
| nop | ; non-operative instruction |
| label 1: | |
| nop | ; non-operative instruction | call anomaly_processing
          ; a problem is detected, the bytes read are not sent
          ; this instruction sends the program to an action program Label :
call prog_cont  ; continuation of the program and program returns bytes read
          ; instruction to be protected ; position of the instruction which, once compiled, will be located at
; the address of the jump +127 bytes figure 16

PROTECTION AGAINST ATTACKS BY GENERATION OF ERRORS ON JUMP INSTRUCTIONS

The present invention relates to a method for making a computer program secure and to a device, in particular a microcircuit card (also called a "microchip card") using such a method. The invention also concerns a generator device for making a program that is associated with this method secure.

In the remainder of this document, making a computer program secure means:
- detecting malicious attacks seeking to disrupt the normal behavior of a computer program; but also
- any processing aiming to make the execution of a computer program reliable and in particular the execution of a program executed in a highly disrupted environment, like a satellite, or the execution of a computer program with a high requirement for reliability, like a program for controlling a cardiac implant, for example.

Moreover, computer program means any program, whatever the computer language and the storage means used. By way of nonlimiting example, the computer program may be written in machine language, assembler language, C, C++, Java, VHDL. The program may be stored in a non-volatile memory, for example in a ROM or EEPROM or on a hard disk, or in a volatile memory, for example of RAM type. The program may equally be produced in the form of an integrated circuit, for example of FPGA type or even of ASIC (Application Specific Integrated Circuit) type.

The present invention aims in particular to detect an attack intended to modify the execution of a computer program being executed on a secure electronic entity, for example a microcircuit card, a secure PCMCIA card (for example an IBM4758 card), a USB key or a passport integrating a contactless microchip in one of its pages, and to trigger a countermeasure to that attack.

The present invention aims very particularly to detect attacks by disrupting the operation of an electronic entity, for example attacks of "fault generation attack" type ("Fault Attack" in English).

These attacks aim to modify illicitly the content or the reading of the content of a register, a memory or a bus, or to oblige a processor not to execute or to execute incorrectly certain instructions of a computer program. The attacked computer program may then be executed in a very different way from that which was intended when it was designed.

Such attacks may be effected, as is known in the art and among other ways:
- by generating a voltage spike at one of the power supply terminals of the processor;
- by suddenly raising its temperature;
- by rapidly changing its clock frequency or its power supply voltage;
- by applying a flash of light, a laser beam, or an electromagnetic field to a portion of the silicon of which it is composed.

Such attacks are particularly active on certain instructions of a program, in particular conditional and unconditional branching instructions.

Examples of branching instructions are the "if" and "case" instructions in C. The compilation of such branching instructions in assembler language produces a conditional or unconditional instruction to jump to an address or an instruction of the program to be reached. The instruction to be reached is identified by a label in a program in assembler language. In the assembler language 8051, the conditional or unconditional jump instructions of C are translated into "jnz" (which may be translated as "jump if result of preceding instruction is not equal to 0"), "jz" (which may be translated as "jump if result of preceding instruction is equal to 0") or "jmp" (which may be translated as "jump") type instructions.

Once compiled into machine language, the instruction to be reached is identified by its address given as an argument (or parameter) of the jump instruction. This address is either an increment or a decrement expressed as a number of bytes relative to the address of the jump instruction, called a relative address, or an absolute address, i.e. a fixed address in the memory. Jump instructions usually include a relative jump address.

The relative address represents the difference expressed in bytes between the address of the instruction to be reached and the address of the jump instruction.

During a fault attack, the execution of a jump instruction may be disrupted in a very great majority of cases, for example during a fault attack leading to a jump to an address not specified by the initial program. In fact, when such an instruction is disrupted, the result obtained is equivalent to a modification of the value of the address given as an argument of the jump instruction. That value is modified at random. Thus if the address of the jump is a relative address, the address that will be reached by the jump instruction disrupted in this way would be an address in the set of addresses accessible from the jump address.

For example, if the relative address given as an argument of the jump instruction is coded on one byte, i.e. on eight bits, a fault attack at this address causes a jump into a memory area from $-(2^7-1)$ to $2^7-1$ bytes, i.e. from $-127$ to $+127$ bytes, relative to the address of the jump instruction. The address reached by the jump after the fault attack is equally probable over this range. Depending on the assembler language used, the relative address may also be coded on two, three or more bytes, in a commensurately larger memory area.

Given that the instructions are coded and stored on two or three bytes, for example, the instruction area preceding and following the jump instruction defined by the relative address therefore typically consists of a maximum of around 100 instructions.

The modification of the address resulting from the jump can lead to unauthorized access to a critical instruction of the program or to sensitive data, for example keys, and thus enable an attacker to imperil the security of the system.

In the current state of the art, the person skilled in the art has various means available for making a computer program secure and in particular for fighting fault attacks on a microcircuit card.

One method consists in installing sensors for detecting such attacks in the components of the microcircuit cards.

However, the efficacy of such method is restricted because it is in practice impossible to place sensors over the whole of the surface of this component. Moreover, these sensors being also made of silicon, it is equally possible to disrupt them or to modify the information that they transmit.

The present invention aims at a software type security method that does not have the above drawbacks.

To this end it proposes a method for making a computer program secure against fault attacks. This method is applicable in particular in a microchip card. According to this method, there is identified in this program at least one jump instruction including a relative address chosen from a plurality of possible relative addresses for reaching a target address in a memory area extending before and after that jump instruction and grouping that plurality of possible relative addresses. An instruction to be protected is identified in this memory area. To make at least that instruction secure, at least one first non-operative batch including at least one instruction is inserted, this insertion being carried out so that:

this insertion is compatible with keeping the target address of the jump instruction inside the memory area, this insertion is compatible with the normal execution of the program.

The security method according to the invention therefore consists in inserting one or more instructions in the memory area extending upstream and downstream of the jump instruction and comprising all the addresses accessible from the target relative address of the jump instruction, i.e. a memory area extending from −127 bytes to +127 bytes if that relative address is coded on one byte.

This increases the security of the instruction to be protected. In fact, during a fault attack generating a modification of the relative address reached by the jump instruction, there is less chance of the instruction to be protected being reached and there is therefore less chance of that instruction being executed at an unintended time, whereas the inserted instructions are favored.

The inserted instructions form a batch, and that batch is non-operative, i.e. it does not modify the functional behavior of the program during normal execution of the program. The instructions constituting a batch include the "empty" instruction (for example the instruction "nop" in assembler language signifying "no operation"), or an instruction having no effect on the result of the execution of the program in normal operation either alone or combined with other instructions.

During an attack or disruption of execution, according to the invention there is a certain probability of ending up in the non-operative batches.

The insertion of the non-operative batch may imply a modification of the argument of the jump instruction for reaching the target address.

However, the insertion of a non-operative batch must be compatible with keeping that target address of the jump instruction inside the memory area defined above.

In addition to instructions to be protected, the program may include instructions that are to the contrary to be favored for the security of the execution of the program. In particular, after a test, the instructions to be executed in the case of a valid test result are generally to be protected whereas the instructions in the case of an invalid test result are often to be favored. This is why, in one particular embodiment, the method comprises the following steps:

identification in the program of a security batch including at least one instruction to be executed, insertion of a non-operative batch, separate from the first non-operative batch or not, preceding the identified security batch and adapted to favor the execution thereof.

This embodiment therefore involves, on the one hand, identifying a security batch, i.e. a set of instructions performing a sensitive action, the non-execution whereof may imperil the security of the system, and then, on the other hand, favoring the execution of the identified security batch, given that this batch must be executed for the security of the program and the card, there having been inserted before into this batch a non-operative batch that increases the probability of executing this security batch. Thus in the case of faults, a jump instruction can reach this non-operative batch that will force it to execute the instructions of the security batch, thus ensuring that the latter batch is executed.

The nature of the first non-operative batch may depend on the relative positions of the jump instruction, the target address of the jump and the instruction to be protected.

If no account is to be taken of these relative positions, in a first embodiment, the first non-operative batch is inserted into the program so that a circumvention instruction normally prevents execution of the instructions of the non-operative batch and an ejection instruction to an action program at the end of the non-operative batch prevents execution of instructions downstream of that non-operative batch.

This embodiment is particularly advantageous because, in normal operation of the program or if the jump instruction normally reaches an instruction upstream of the inserted non-operative batch, a circumvention instruction prevents the execution of instructions of that non-operative batch.

In fact, in the absence of jump type instructions, instructions that call subroutines or return to the calling program (assembler instruction "ret", "return" in English) preceding the first non-operative batch, that batch would be reached. The presence of a circumvention instruction prevents this kind of problem.

Accordingly, during normal operation of the program, this inserted non-operative batch of instructions is advantageously not executed and the performance of the program (modified performance, induced by adding the batch of instructions) is virtually unmodified.

Moreover, an ejection instruction situated substantially at the end of the inserted non-operative batch is present so that, in the case of disruption of the jump instruction, the jump reaches this first non-operative batch of instructions, and this ejection instruction prevents execution of instructions downstream of the non-operative batch and therefore prevents execution of the instruction to be protected if the latter is downstream of that batch. In this case, the security of the system is greatly increased because this non-operative batch, executed in the case of a fault, prevents reaching the instruction to be protected and execution of that instruction to be protected at an unintended time. In fact, even if this non-operative batch is not inserted before the instruction to be protected, security is improved simply by the fact that there is ejection if the jump lands in this non-operative batch following disruption.

According to an advantageous feature, the action program comprises a security batch including at least one instruction to be executed.

In fact, in one particular embodiment, the action program comprises instructions that must be executed for the security of the program. Thus the security of the program is significantly increased by the fact that, in case of disruption, there is an increased probability of executing a security batch comprising a series of instructions that are important to the security of the program.

In a first variant of this embodiment, the circumvention instruction forms part of the program to be made secure and precedes the non-operative batch so that the latter non-operative batch is normally not executed.

In a second variant of this embodiment, the circumvention instruction is at the beginning of the non-operative batch and goes to the first instruction of the program downstream of this non-operative batch.

In this case, the non-operative batch may be inserted downstream of any instruction of the program, the first instruction of this batch (circumvention instruction) going to that instruction.

It is worth noting that the various embodiments preventing execution of non-operative batches limit the potential losses of performance caused by the insertion of code.

Certain rules for the positioning of the first non-operative batch may be advantageous and enable simplification of the structure of that batch. It is thus preferable if the first non-operative batch is inserted after the first of said jump instructions or instructions to be protected.

This feature advantageously contributes to making a program secure, as will become apparent hereinafter.

In a first embodiment of the security method, the non-operative batch is inserted between the instruction to be protected and the jump instruction if that instruction to be protected precedes the jump instruction.

This feature is particularly advantageous; in fact its function is to move the instruction to be protected away from the jump instruction by inserting batches between the two instructions and to move this instruction to be protected into the memory area accessible from the address of the jump instruction and preceding the jump instruction. The instruction to be protected being moved into the memory area preceding the jump instruction, in the event of disruption of the relative address of the jump, the chances of this instruction being executed are reduced despite the fact that the addresses are accessible with equal probability. In fact, at the time of a jump, execution continues by incrementing the address of the instructions, and the probability of executing the instruction to be protected after insertion of the non-operative batch is thereby reduced.

Advantageously, if, furthermore, the instruction to be protected precedes the target address of the jump instruction, the non-operative batch includes a number of instructions such that, after insertion, the instruction to be protected is upstream of the memory area accessible by the jump instruction.

The non-operative batch preferably comprises at least m instructions with $m=2^{n-1}$+the relative address (before it is made secure) of the instruction to be protected relative to the jump instruction, n being the number of bits on which the relative address of the jump is coded.

Thus the insertion of the non-operative batch is effected so that the latter leads to the instruction to be protected leaving the memory area preceding the jump instruction, making access to it from the jump instruction impossible.

Alternatively, if the target address of the jump instruction precedes the instruction to be protected, then the non-operative batch comprises at most p instructions with $p=2^{n-1}-1$+the target relative address (before it is made secure) of the jump instruction, n being the number of bits on which the relative address of the jump is coded, whereby the target instruction remains in the memory area after it is made secure.

In fact, to comply with the constraint that the insertion must be compatible with keeping the target address of the jump instruction inside the memory area preceding the jump address, if the instruction to be protected is inside the area defined by the jump address of the jump instruction, then the number of instructions that the non-operative batch contains is limited so that the instruction at the target address of the jump instruction is not moved out.

The non-operative batch is preferably inserted so as to be executed only in case of disruption of the jump instruction, a circumvention instruction normally preventing execution of instructions of this non-operative batch.

Accordingly, during normal operation of the program, this inserted non-operative batch of instructions is advantageously not executed, which greatly limits the disruption in terms of the performance of the program, disruption of performance induced by the addition of the batch of instructions.

The non-operative batch advantageously also includes at the end of the non-operative batch an ejection instruction preventing execution of instructions downstream of that non-operative batch.

That instruction is present so that, in the case of disruption of the jump instruction, the jump reaches a non-operative batch of instructions, an ejection instruction prevents the execution of instructions downstream of the non-operative batch and therefore prevents execution of the instruction downstream of the non-operative batch.

In a second embodiment of the security method, the non-operative batch is inserted between the jump instruction and the instruction to be protected so as to be executed only in case of disruption of the jump instruction, and an ejection instruction at the end of the non-operative batch prevents execution of instructions downstream of that non-operative batch.

Accordingly, when the non-operative batch is inserted downstream of the jump instruction and the latter precedes the instruction to be protected, then that insertion pushes the instruction to be protected out of the memory area following the jump instruction. The risk of the jump instruction reaching an instruction to be protected following disruption of its address is therefore reduced.

When inserting a batch between the jump instruction and the instruction to be protected, that batch should advantageously contain at least one ejection instruction. The latter instruction, in the case of disruption of the jump instruction, the jump reaching this batch, prevents execution of instructions downstream of this batch and therefore of the instruction to be protected.

The non-operative batch is preferably inserted just upstream of the target address of the jump instruction when the target address of the jump instruction is upstream of the instruction to be protected.

Thus in normal operation of the program, this inserted non-operative batch of instructions is advantageously not executed, and the disruption in terms of program performance, disruption of performance induced by adding the batch of instructions, is thus very limited.

In one embodiment, a circumvention instruction normally prevents execution of instructions of the non-operative batch.

The circumvention instruction is preferably at the start of the non-operative batch and goes to the first instruction of the program downstream of that non-operative batch Advantageously, in these embodiments, the non-operative batch may be inserted downstream of a program instruction, whatever that program instruction might be. Thus in order not to execute the inserted non-operative batch in normal operation and thus to arrive at an ejection instruction, the first instruction of that batch is an instruction circumventing this batch and going to the first instruction downstream of this batch.

Moreover, the various embodiments prevent the execution of non-operative batches and thus limit the potential losses of performance caused by the insertion of code.

If the instruction to be protected precedes the target address of the jump instruction, the non-operative batch advantageously comprises at most q instructions where $q=2^{n-1}-1-$ target relative address of the jump instruction and n is the number of bits on which the target relative address of the jump instruction is coded, thanks to which the target instruction remains in the memory area after it is made secure.

In fact, to preserve the constraint whereby the insertion is compatible with keeping the target address of the jump instruction inside the memory area, the number of non-operative instructions that may be added is limited.

Thus it is not possible to push the instruction targeted by the jump instruction out of the memory area following the jump instruction.

The security effect is achieved in the event of a fault. Thus the probability of this effect is proportional to the size of the non-operative batch.

In the alternative in which the first instruction is the jump instruction and the target address of the jump instruction precedes the instruction to be protected, the non-operative batch is inserted between the target address of the jump instruction and the instruction to be protected.

The insertion of non-operative batches between the target address of the jump instruction and the instruction to be protected enables the instruction to be protected to be pushed out of the memory area accessible following the jump instruction.

According to one feature, the instruction to be protected is at the end of the memory area after the jump instruction.

The non-operative batch preferably includes a number of instructions such that, after insertion, the instruction to be protected is downstream of the memory area.

Thus the insertion of the batch leads to the instruction to be protected leaving the memory area preceding the jump instruction, making access to it from the jump instruction impossible.

In this embodiment, the non-operative batch comprises at least r instructions, with $r=2^{n-1}$–the relative address of the instruction to be protected relative to the jump instruction, n being the number of bits on which the relative address of the jump is coded.

In a third embodiment, the insertion is effected after the second of said instructions of the program so that a circumvention instruction normally prevents execution of the instructions of the batch and an ejection instruction at the end of the batch prevents execution of instructions downstream of that batch.

The circumvention instruction preferably forms part of the program to be made secure and precedes the non-operative batch so that this non-operative batch is normally not executed.

Alternatively, the circumvention instruction is at the start of the non-operative batch going to the first instruction of the program downstream of that non-operative batch.

In these embodiments, the non-operative batch may advantageously be inserted downstream of a program instruction, whatever that program instruction might be. In order not to execute the inserted non-operative batch in normal operation, and thus to arrive at an ejection instruction, the first instruction of this batch is therefore an instruction for circumventing this batch and going to the first instruction downstream of the batch.

Moreover, the various embodiments prevent the execution of non-operative batches and therefore limit potential losses of performance caused by the insertion of code.

According to one feature, the instruction to be protected preceding the security batch and the instruction to be protected and the security batch being on the same side of the jump instruction, the non-operative batch is inserted between the instruction to be protected and the security batch.

Accordingly, when it is more a question of favoring the security batch than protecting the instruction to be protected, the non-operative batch is inserted in such a manner as to lead the execution of the program to the security batch in the case of attack. According to this method, the execution of the security batch is favored, although nevertheless protecting the instruction to be protected.

More particularly, if the instruction to be protected is just after the jump instruction, the non-operative batch is inserted so that the security batch is at the end of the memory area.

In this way the memory area following the jump instruction comprises the instruction to be protected just after the jump instruction, and the memory area is then filled with a set of non-operative instructions forming a non-operative batch, with the result that the security batch is at the end of the memory area.

Alternatively, when the security batch is just before the jump instruction, the non-operative batch is inserted so that the instruction to be protected is at the start of the memory area.

According to another feature, the security batch precedes the instruction to be protected, the security batch and the instruction to be protected are on the same side of the jump instruction, and the non-operative batch is inserted upstream of the security batch and on the same side of the jump instruction as the security batch.

Accordingly, when it is more a question of favoring the security batch than of protecting the instruction to be protected, then the non-operative batch is inserted in such a manner as to lead the execution of the program to the security batch in case of attack. According to this method the execution of the security batch is favored, although nevertheless protecting the instruction to be protected.

More particularly, the non-operative batch is inserted so that the instruction to be protected is at the end of the memory area.

In one particular embodiment of the invention, after insertion of said non-operative batch, there is identified in this memory area at least one other instruction to be protected and, to make that other instruction secure, another non-operative batch including at least one instruction is inserted, that instruction being executed in accordance with said conditions.

In another embodiment of the invention, before the insertion of a non-operative batch, there is identified in this memory area at least one other instruction to be protected, and the non-operative batch is inserted in accordance with the conditions vis à vis each of the instructions to be protected.

After making the memory area extending before and after this jump instruction secure, the memory area advantageously includes at least 90% of instructions forming parts of inserted non-operative batches.

Said memory area thus including at least 90% of instructions coming from inserted non-operative batches, the probability of reaching an instruction of a non-operative batch following disruption is maximized, thus limiting the risk of reaching an instruction to be protected.

In one embodiment, a non-operative batch comprises a plurality of instructions.

In one variant of the invention, the non-operative batch comprises at least one ejection instruction to an action program.

This embodiment not only limits the effect of disruption but also detects disruption and launches action programs with the aim of countering attacks or making the execution of a program reliable.

Alternatively, the inserted non-operative batch comprises at least one ejection instruction to an action subroutine.

According to one feature, the action program comprises a security batch including at least one instruction to be executed.

In fact, in one particular embodiment, the action program comprises instructions that must be executed for the security of the program. Accordingly, the security of the program is significantly enhanced by the fact that, in case of disruption, there is an increased probability of executing a series of instructions important to the security of the program.

The action program advantageously comprises instructions for prematurely terminating execution of the program.

In this embodiment, the program has detected an attack or disruption at the time of execution, which terminates the execution of the program.

Alternatively, the action program comprises instructions for reinitializing the execution of the program.

The invention also relates to a secure method of execution of a program made secure against fault attacks, in particular in a microchip card. The method uses a step of making the program secure in accordance with the invention prior to the execution of said program.

In a correlated way, the invention relates to a device for making a program secure comprising means for identifying in that program at least one jump instruction including a relative address chosen from a plurality of possible relative addresses and enabling an address to be reached in a memory area extending before and after that jump instruction and grouping all the addresses accessible from the relative address, means for identifying an instruction to be protected in the memory area, and means for inserting at least one non-operative batch including at least one instruction for making at least that instruction secure.

This device has the same advantages as the method of making a program secure against fault attacks briefly described hereinabove.

The invention is also directed to an information medium readable by an electronic data processing system, possibly totally or partially removable, in particular CD-ROM or magnetic medium, such as a hard disk or a diskette, or transmissible medium such as an electrical or optical signal, this information medium including instructions of a computer program for executing a security method as briefly described hereinabove when that program is loaded into and executed by an electronic data processing system.

The invention is further directed to a computer program stored on an information medium, said program including instructions for executing a security method as briefly described hereinabove when that program is loaded into and executed by an electronic data processing system.

The particular features and advantages specific to the information medium, the computer program and the microcircuit card being the same as those explained hereinabove with reference to the security method according to the invention, they will not be repeated here.

Other aspects and advantages of the present invention will become more clearly apparent on reading the following description of particular embodiments, that description being given by way of nonlimiting example only, with reference to the appended drawings, in which:

FIG. 9 is an example of a computer program that can be made secure by a security method according to the present invention.

FIG. 10 is the assembler code obtained after execution of the security method according to the invention in the FIG. 9 example.

FIG. 11 is a second example of a computer program that can be made secure by a security method according to the present invention.

FIG. 12 is the assembler code after execution of the security method according to the invention in the FIG. 11 example so that the instruction to be protected is upstream of the memory area accessible by the jump instruction.

FIG. 13 is a third example of a computer program that can be made secure by a security method according to the present invention.

FIG. 14 is the assembler code after execution of the security method according to the invention in the FIG. 13 example so that the inserted instructions comprise a circumvention instruction and an ejection instruction.

FIG. 15 is the assembler code after execution of the security method according to the invention applied with a conditional jump instruction.

FIG. 16 is an alternative assembler code after execution of the security method according to the invention applied with a conditional jump instruction.

It is generally possible to identify in a program instructions to be protected, to be executed only advisedly, and instructions to be favored, whose execution contributes to the reliability of the program. Thus in particular instructions to be executed after verification of diverse tests may often be considered as sensitive instructions that it is better to protect, while correction instructions to be executed if the tests are negative may often be considered as security instructions that it is better to favor.

It may be noted that after a test an alternative can therefore generally be identified between an instruction to be protected and an instruction to be favored and that the fact of reducing the chances of the instruction to be protected being executed in case of disruption or of disruption of the jump often comes back to increasing the probability of executing other instructions.

To this end, there may be inserted into the starting program a non-operative batch that is compatible with keeping the target address of the jump instruction inside the accessible memory area and that does not disturb the normal execution of the program.

A general solution consists in inserting, at any location, a batch beginning with a circumvention instruction that goes to the instruction after this jump and ending with an ejection instruction to an action program or subroutine (initialization, repetition of the test, complementary tests, etc., even destruction of the card).

Such a batch thus acts as a trap detecting erroneous jump results, in particular results of a jump disrupted by an attack.

Diverse particular cases may nevertheless be identified that specifically enhance the protection of the instruction to be protected (possibly by favoring security instructions) and/or simplifying the composition of the non-operative batches. The particular cases may be defined with reference to the relative positions of the instruction to be protected and the jump instruction, even the target address of the jump.

It is important to note here that there may be an arbitrary choice of jump instructions and instructions to be protected (or a contrario instructions to be favored) and that, in a given program, the choice may be made not to make all of the relative jumps secure or not to protect all sensitive instructions.

Figure 1:
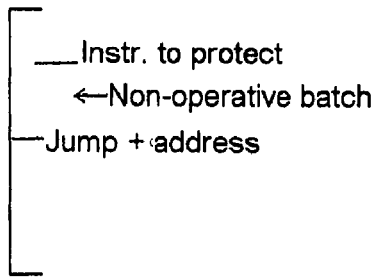
FIG. 1 is a theoretical diagram of the security method according to the invention, in a case where the instruction to be protected precedes the jump instruction.

Referring to FIG. 1, there is shown a diagram of the theory of the invention, wherein a jump instruction is followed by a relative address enabling a represented memory address to be reached on its execution.

The address given as an argument of the jump instruction is a relative address coded on n bits. For example, the number of bits is eight, representing one byte. This instruction executes a jump in a memory from $-(2^{n-1}-1)$ to $2^{n-1}-1$. According to the example considered here, the memory area accessible by the jump instruction runs from $-127$ to $+127$ bytes.

At least one instruction to be protected is identified in this memory area. An instruction to be protected is identified as an instruction that is hazardous to the security of the system if it is executed at an unintended time. Thus an instruction to be made secure may be defined either as an instruction to be executed only at the right time or as an instruction that must be executed at a given time during the execution of the program.

In the case of FIG. 1, an instruction to be protected is identified in the area that can be accessed by a jump instruction and upstream of that jump instruction.

In case of an attack on the jump instruction, that instruction has the same probability of reaching any of the instructions belonging to the memory area from $-(2^{n-1}-1)$ to $2^{n-1}-1$.

However, to limit the probability of reaching the instruction to be protected, non-operative instructions are inserted between the instruction to be protected and the jump instruction. The role of this insertion is to move the instruction to be protected out of the memory area accessible by the jump instruction, knowing that execution of the program is effected in order of increasing addresses.

Thus the instruction to be protected should preferably not be positioned at an address higher than its initial address at the time of insertion of an operative batch. In fact, on an attack on the jump address, if the jump goes to a lower address or to an address equivalent to the instruction to be protected, and if the instruction to be protected is positioned at a higher address, then that instruction to be protected will be executed.

These non-operative instructions forming a non-operative batch are for example instructions whose facts cancel each other out, for example instructions to increment or decrement a variable or instructions to assign a variable that is not used in the remainder of the program.

The non-operative batch, being a series of instructions having no effect on the program, is inserted in the program so that the circumvention instruction normally prevents the execution of the instructions of this batch and an ejection instruction situated at the end of this batch prevents the execution of instructions downstream of this batch.

Referring to FIG. 1, the non-operative batch is inserted between the instruction to be protected and the jump instruction. This batch may include, firstly, substantially in the first instructions, a circumvention instruction for reaching the instruction after the non-operative batch.

If a circumvention instruction is situated before this non-operative batch, then the batch optionally includes that circumvention instruction.

However, the insertion of such an instruction prevents the execution of this non-operative batch during normal execution of the program, therefore introducing no execution time penalty in respect of the program.

Similarly, this batch may comprise substantially at the end an ejection instruction to an action program, that instruction preventing execution of instructions downstream of this batch.

The ejection instruction is a non-operative instruction of the jump instruction or subroutine call instruction type, whose argument in the latter case is the address of the action program.

Thus, in case of attack, if the jump instruction goes to the non-operative batch, the execution of the program is trapped to an action program.

That action program is made up of at least one instruction aiming to execute a countermeasure or more generally a security batch. For example, it may be a program for destroying the card, executing an infinite loop or reinitializing the program. It may equally be a security batch, i.e. a set of instructions effecting a sensitive action whose non-execution may imperil the security of the system. For example, the security batch may be intended to read a sensitive key or to carry out an authentication before authorizing access.

A particular case in which the instruction to be protected precedes the target address of the jump instruction is described with reference to FIG. 2.

In such a case, in order to protect as much as possible the instruction to be protected, a non-operative batch must be inserted between the instruction to be protected and the target address of the jump. Thus the instruction to be protected is moved away from the jump instruction and preferably out of the area accessible by the jump instruction.

This non-operative batch preferably includes a number of instructions such that, after its insertion, the instruction to be protected is moved out of the memory area accessible by the jump instruction.

In order to move the instruction to be protected out of the memory area accessible by the jump instruction, that number of instructions must be at least equal to $m=2^{n-1}+x$, where n is the number of bits on which the target relative address of the jump instruction is coded and x is the relative address of the instruction to be protected relative to the jump instruction.

Figure 3:
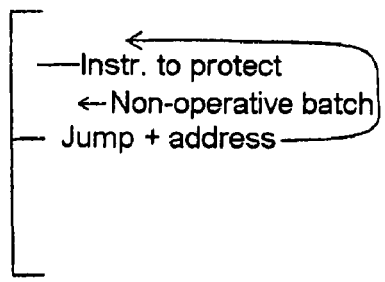
FIG. 3 is another special case of FIG. 1 in which, in contrast, the target address of the jump instruction precedes the instruction to be protected.

Another particular case in which the target address of the jump instruction precedes the identified instruction to be protected is described with reference to FIG. 3.

In such a situation, the non-operative batch of instructions is advantageously inserted between the instruction to be protected and the jump instruction. In fact, as for the examples of FIG. 1 and FIG. 3, the instruction to be protected is preferably moved away from the jump instruction. However, given that the target address of the jump instruction is lower than the address of the instruction to be protected, that instruction to be protected cannot be moved out of the memory area accessible by the jump instruction.

Thus the number of instructions that the inserted non-operative batch of instructions may contain is at most p instructions where $p=2^{n-1}-1+y$, n is the number of bits on which the relative address of the jump is coded and y is the target relative address of the jump instruction.

The insertion of such a batch shifts the instruction to be protected so that the target address of the jump instruction is at the maximum the first address accessible in the memory area.

Figure 4:
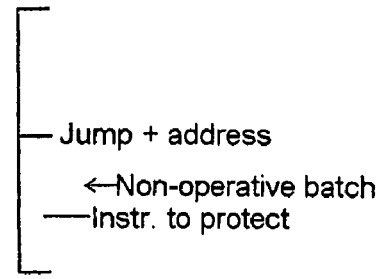
FIG. 4 is a theoretical diagram of the security method according to the invention, in a case where the jump instruction precedes the instruction to be protected.

A particular case in which the jump instruction precedes the instruction to be protected is represented in FIG. 4.

The non-operative batch is advantageously inserted between the jump instruction and the instruction to be protected.

If this non-operative batch is executed following an attack, this batch of instructions comprises substantially at the end of the batch an ejection instruction preventing execution of instructions downstream of the batch.

Figure 5:
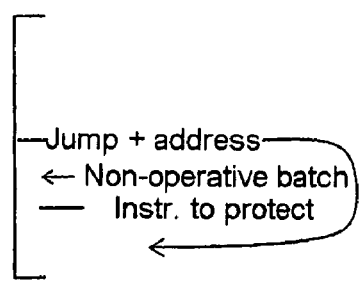
FIG. 5 is a special case of FIG. 4 in which the instruction to be protected precedes the target address of the jump instruction.

In the case where the target address of the jump instruction is downstream of the instruction to be protected, the non-operative batch is inserted between the jump instruction and the instruction to be protected, thus pushing the instruction to be protected away from the jump instruction, as shown in FIG. 5.

If the target address of the jump instruction is upstream of the instruction to be protected, then the non-operative batch is preferably inserted downstream of the target address of the jump instruction.

The function of this insertion is to move the instruction to be protected out of the memory area accessible by the jump instruction.

In order to move the instruction to be protected out of the memory area accessible by the jump instruction, this non-operative batch must comprise at least r instructions where $r=2^{n-1}-y$, n is the number of bits on which the relative address of the jump is coded and y is the relative address of the instruction to be protected.

Figure 7:
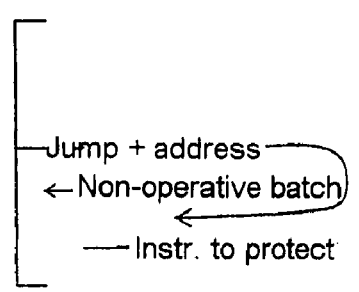
FIG. 7 is a theoretical diagram of the security method according to the invention, in a case where the jump instruction precedes the instruction to be protected.

Referring to FIG. 7, a non-operative batch may be inserted just before the target address of the jump instruction if the target address of the jump instruction is upstream of the instruction to be protected.

Figure 8:
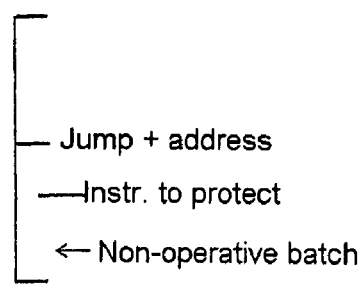
FIG. 8 is a second theoretical diagram of the security method according to the invention, in a case where the jump instruction precedes the instruction to be protected.

Referring to FIG. 8, a non-operative batch may be inserted after the instruction to be protected if the latter is downstream of the jump instruction. This batch preferably comprises a circumvention instruction substantially in the first instructions of this batch and an ejection instruction at the end of the batch that prevents execution of instructions downstream of this batch.

In a complementary manner to the protection of sensitive instructions, non-operative batches may serve to favor a security batch, for example the instructions constituting, after a jump, the alternative to the instructions to be protected.

Thus, by the insertion of the non-operative batch, the method can favor the execution of a batch of security instructions, the latter being formed of a set of instructions that must be executed for the security of the program.

The instructions of the security batch are instructions effecting sensitive actions whose non-execution following an attack may imperil the security of the system, although that instruction has been executed normally.

Repeated execution of a security batch not specified by the program does not generally imperil the security of the system.

For example, a security batch may consist in accessing a key in memory, for example of EEPROM type, before executing encryption of sensitive data, the result of the encryption having to be sent by the card to the terminal. If the encryption key is not read following an attack, there is the risk of the card sending the sensitive data to the terminal, in clear or encrypted with a degraded key, which may imperil the security of that data. This is particularly important when manipulating secret data.

Accordingly, such a security batch must be executed, despite a functional error or following an attack, in order to ensure that the key is in fact read, for example.

In a second example of a security batch, the calculation and the verification of a checksum value, for example, accompanying each record stored in the memory of a microchip card must be executed after reading data in a file, in particular after a read command ("read" instruction), and before the card sends the read data to the terminal in which the microchip card is inserted. Thus the card verifies that it has read the data and verifies the integrity of the data that it is storing.

An attack may consist, for example, in disrupting reading so that the reading is effected in unauthorized areas, areas that may contain a secret.

The verification of the checksum value effected by the card gives an attacker a problem, since the reading disrupted in most cases causes the card to read the checksum value in an area of the memory where there is other data and not the checksum value. Thus this checksum value obtained from the data read in the memory by the card and the checksum value calculated by the card do not match. This card therefore detects a reading error and does not send the read data to the terminal.

The security batch may thus constitute anomaly processing, for example stemming from a functional error or from the detection of an attack. Thus a non-operative batch is inserted so that in the event of a fault there is an increased probability of the jump reaching that non-operative batch, that non-operative batch leading to the execution of the security batch.

FIG. 9 shows a program in assembler language in which two instructions to be protected upstream of the jump instruction are represented. These instructions are to be protected because they may be hazardous if they are executed at a time not specified in the program, for example following a fault attack. These two instructions are, on the one hand, the instruction "call call1", which is a call to a subroutine "call1", and, on the other hand, the instruction "inc a", which is an instruction to increment a variable. The jump instruction "jz label" (signifying "jump if the result of the preceding instruction is equal to 0") is downstream of these two instructions to be protected.

Figure 2:
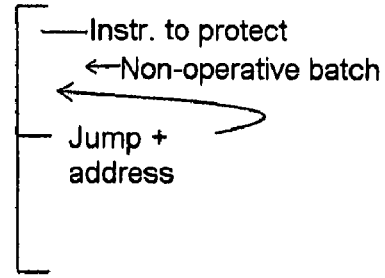
FIG. 2 is a special case of FIG. 1 in which the instruction to be protected furthermore precedes the target address of the jump instruction.

FIG. 10, based on the FIG. 9 example, shows the insertion of non-operative instructions in the memory area accessible by the conditional jump instruction "jz label", enabling instructions to be protected to be pushed out of this memory area as shown in FIG. 1 and in FIG. 2.

This limits the risk of an attacker reaching an instruction to be protected following a fault attack on this jump instruction. This makes the execution of this program more secure.

The non-operative batch inserted between the instruction to be protected and the jump instruction may not contain an ejection instruction. In fact, if an attacker reaches an instruction of this batch then execution of the program returns to the jump instruction and therefore to the test preceding that instruction (instruction "and"), which ensures that this jump instruction will be executed again, thereby making the program secure.

Referring to FIG. 9, a "call call4" instruction to be detected is situated downstream of the jump instruction. FIG. 10 shows that in order to protect this instruction, a non-operative batch is inserted between the jump instruction and the instruction to be protected, also shown in FIG. 4. However, in the case of this FIG. 4, if an attacker reaches an instruction of the non-operative batch situated between the jump instruction and the instruction to be protected, in the absence of ejection instructions of jump or subroutine call type, the instruction to be protected is executed anyway. As described hereinabove with reference to FIG. 4, this non-operative batch must preferably include an ejection instruction preventing execution of instructions downstream of this batch.

FIG. 11 shows another example of a program in assembler language, representing the case of an unconditional jump instruction "jump" preceding the following instructions to be protected: "call call1" and "inc a".

FIG. 12, based on FIG. 11, shows how the assembler program from FIG. 11 is made secure.

Figure 6:
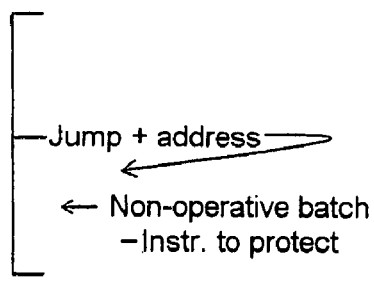
FIG. 6 is another special case of FIG. 4 in which the target address of the jump instruction precedes the instruction to be protected.

The instructions "call call1" and "inc a" to be protected are situated downstream of the target address of the jump instruction "label 2". In order to make these instructions secure as shown in FIG. 6, non-operative batches are inserted between the target address of the jump instruction and the instructions to be protected, causing those instructions to move out of the area accessible by the jump instruction. Those instructions are then not directly accessible by the jump instruction.

It may be noted that the FIG. 11 example includes instructions that may be sensitive, for example the instruction "call call2", which are not protected by non-operative batches. There is the option of deciding to iterate (or not) the security procedure a propos of those other instructions to be protected. In one embodiment, after making the memory area secure by insertion of non-operative batches, the latter area includes at least 90% of non-operative instructions. This maximizes the probability of an attacker disrupting the address of the jump instruction reaching an instruction of a non-operative batch. This limits the risk of reaching an instruction to be protected.

Referring to FIG. 13, an attacker may attempt to disrupt the jump instruction in order to prevent the execution of an anomaly processing program. Thus in the FIG. 13 example the attacker may, for example, execute code that reads data in memory and recovers that data fraudulently. For example, the attacker may jump the instruction "Call anomaly_processing", which call is effected if the calculation and the verification of the checksum are invalid, these operations having to take place before the data that has been read is sent to the terminal in which the microchip card is inserted with a view to verifying its integrity.

To ensure that a security batch is executed in case of attack, at least one non-operative batch is placed at the addresses immediately preceding the security batch, as shown in FIG. 14. The security batch identified is the call to the action program "Call anomaly_processing". Accordingly, if the attacker happens upon a non-operative instruction belonging to the non-operative batch during an attack, for example, the security batch is executed anyway. In fact, the non-operative instructions of the non-operative batch lead the execution of the program to the security batch, thus forcing its execution. Thus, according to the invention, the probability of executing a security batch is increased while the probability of executing an instruction to be protected is reduced.

FIGS. 15 and 16 show two examples of making a program secure in the case of a conditional jump. In these examples, "alternative instructions" means instructions constituting an alternative to execution of the instructions situated at the target address of the conditional jump instruction.

In a first embodiment, the alternative instructions further comprise the instruction to be protected "Call prog_cont", the role of which is normal continuation of the program. This instruction is situated after the jump instruction and is accessible by the jump instruction. For example, this instruction is the first instruction after this jump instruction. In the FIG. 15 example, the alternative instructions contain the instruction to be preserved followed by a non-operative batch extending up to the end of the memory area, for example, constituting a particular case of FIG. 8.

The security batch containing the anomaly processing is situated substantially in the last addresses of the memory area accessible by the jump instruction. In one particular embodiment, the non-operative batch is inserted so that the security batch starts at the last accessible instruction of this memory area. Thus optimum protection is obtained for the memory area immediately after the jump instruction.

In fact, the probability of executing the instruction to be protected is minimized and the probability of executing the security batch, the non-operative batch, formed on non-operative instructions leading execution of the program to the security batch in case of attack, is maximized.

This may equally well be effected in the memory area situated before the jump instruction. In this case, the security batch is just before the jump instruction and the test instruction, if any, that conditions the jump, and the insertion of the non-operative batch is such that the instruction to be protected is at the start of the memory area.

In a second embodiment, shown in FIG. 16, the alternative instructions comprise the security batch. According to this figure, the security batch precedes the instruction to be protected. In order to maximize the probability of executing the security batch and minimize the probability of executing the instruction to be protected in case of attack, a non-operative batch of instructions is inserted after the jump instruction and upstream of the security batch. For example, the non-operative batch is placed immediately after the jump instruction. Thus this non-operative batch is followed, first of all, by the alternative instruction (the security batch) and then the instruction to be protected, the latter having to remain accessible by the target address of the jump instruction, the objective of the jump instruction being to reach that instruction to be protected.

In this way optimum protection is also obtained for the memory area after the jump instruction, since the probability of executing the instruction to be protected is minimized and the probability of executing the security batch is maximized, for example following a fault attack.

This may equally well be effected in the memory area situated before the jump instruction.

According to a variant of the invention, the jump instruction performs only a forward jump. Optimum protection thanks to the invention is obtained in this way as shown in FIGS. 15 and 16. In fact there is no risk in case of attack of the jump reaching an instruction preceding the jump instruction.

According to another variant, a new conditional jump instruction may be envisaged, that instruction having two relative jump addresses as parameters. The known conditional instructions such as "jz" or "jnz" have a parameter indicating a relative jump address. These instructions have two functional outputs. In fact, these instructions effect a jump to the relative address if the result of the preceding instruction is equal to 0 or not equal to 0, respectively, and if not execution continues at the address following the jump instruction.

According to the invention, the new jump instruction includes two relative addresses so that this instruction effects a jump to the first relative address if the result of the preceding instruction is equal to 0, for example, or a jump to the second relative address otherwise.

A program comprising this new instruction may be made secure by the addition of batches of non-operative instructions and batches of security instructions, for example, before the first jump address, before the second jump address.

The invention claimed is:

1. A method of making a program secure against fault attacks, comprising:
   identifying, in the program being made secure, at least one jump instruction including a relative jump address chosen from a plurality of possible relative addresses for reaching a target instruction of the program being made secure at a target address in a memory area extending before and after that jump instruction and grouping said plurality of possible relative addresses;
   identifying, in the program being made secure, an instruction to be protected in the memory area; and to make at least the identified instruction secure, inserting at least one non-operative batch including at least one instruction, the insertion being carried out so that:
the insertion is compatible with keeping the target address of the jump instruction inside the memory area after the insertion, and
the insertion is compatible with a normal execution of the program being made secure, after the insertion,
wherein the non-operative batch is inserted into the program being made secure, so that a circumvention instruction normally prevents execution of the at least one instruction of the non-operative batch, and an ejection instruction to an action program at the end of the non-operative batch prevents execution of instructions downstream of the non-operative batch, and
wherein the non-operative batch is inserted after a first of said at least one jump instruction or the instruction to be protected.

2. The method according to claim 1, wherein the method further comprises the following steps:
identifying in the program being made secure of a security batch including at least one instruction to be executed,
inserting another non-operative batch, distinct from the non-operative batch, preceding the identified security batch and adapted to favor the execution thereof.

3. The method according to claim 1, wherein the action program comprises a security batch including at least one instruction to be executed.

4. The method according to claim 1, wherein the circumvention instruction forms part of the program to be made secure and precedes the non-operative batch so that the non-operative batch is normally not executed.

5. The method according to claim 1, wherein the circumvention instruction is at the start of the non-operative batch and goes to a first instruction of the program being made secure downstream of the non-operative batch.

6. The method according to claim 1, wherein the non-operative batch is inserted between the instruction to be protected and the jump instruction if the instruction to be protected precedes the jump instruction.

7. The method according to claim 6, wherein if the instruction to be protected precedes the target address of the jump instruction, the non-operative batch includes a plurality of instructions such that, after insertion, the instruction to be protected is upstream of the memory area accessible by the jump instruction.

8. The method according to claim 7, wherein the non-operative batch comprises at least m instructions where $m=2^{n-1}+\text{ADD\_TO\_PROTECT}$, n being the number of bits on which the relative address of the jump is coded and ADD_TO_PROTECT is the relative address of the instruction to be protected relative to the jump instruction.

9. The method according to claim 6, wherein the target address of the jump instruction precedes the instruction to be protected, and the non-operative batch comprises at most p instructions where $p=2^{n-1}-1+\text{JUMP\_ADD}$, n being a number of bits on which the relative jump address of the jump instruction is coded and JUMP_ADD is a relative jump address of the jump instruction, in response to which the target instruction remains in the memory area after the program is made secure.

10. The method according to claim 6, wherein the non-operative batch is inserted so as to be executed only in case of disruption of the jump instruction, a circumvention instruction normally preventing execution of instructions of the non-operative batch.

11. The method according to claim 10, wherein the non-operative batch includes at the end of the non-operative batch an ejection instruction preventing execution of instructions downstream of the non-operative batch.

12. The method according to claim 1, wherein the non-operative batch is inserted between the jump instruction and the instruction to be protected so as to be executed only in case of disruption of the jump instruction, an ejection instruction at the end of the non-operative batch preventing execution of instructions downstream of the non-operative batch.

13. The method according to claim 12, wherein the non-operative batch is inserted just upstream of the target address of the jump instruction if the target address of the jump instruction is upstream of the instruction to be protected.

14. The method according to claim 12, wherein a circumvention instruction normally prevents execution of instructions of the non-operative batch.

15. The method according to claim 14, wherein the circumvention instruction is at a start of the non-operative batch and goes to the first instruction of the program being made secure downstream of the non-operative batch.

16. The method according to claim 12, wherein if the instruction to be protected precedes the target address of the jump instruction, the non-operative batch comprises at most q instructions where $q=2^{n-1}-1-\text{JUMP\_ADD}$, n being a number of bits on which the target relative address of the jump instruction is coded and JUMP_ADD is a target relative address of the jump instruction, thanks to which the target instruction remains in the memory area after the program is made secure.

17. The method according to claim 12, wherein if the target address of the jump instruction precedes the instruction to be protected, the non-operative batch is inserted between the target address of the jump instruction and the instruction to be protected.

18. The method according to claim 17, wherein the instruction to be protected is at the end of the memory area after the jump instruction.

19. The method according to claim 17, wherein the non-operative batch includes a plurality of instructions such that, after insertion, the instruction to be protected is downstream of the memory area.

20. The method according to claim 19, wherein the non-operative batch comprises at least r instructions where $r=2^{n-1}-\text{ADD\_TO\_PROTECT}$, n being a number of bits on which the relative address of the jump is coded and ADD_TO_PROTECT is a relative address of the instruction to be protected relative to the jump instruction.

21. The method according to claim 1, wherein the insertion is effected after a second of said instructions of the program being made secure so that a circumvention instruction normally prevents execution of the instructions of the non-operative batch and an ejection instruction at an end of the non-operative batch prevents execution of instructions downstream of the non-operative batch.

22. The method according to claim 21, wherein the circumvention instruction forms part of the program to be made secure and precedes the non-operative batch so that the non-operative batch is normally not executed.

23. The method according to claim 21, wherein the circumvention instruction is at a start of the non-operative batch going to a first instruction of the program being made secure downstream of the non-operative batch.

24. The method according to claim 2, wherein the instruction to be protected preceding the security batch and the instruction to be protected and the security batch being on the same side of the jump instruction, the non-operative batch is inserted between the instruction to be protected and the security batch.

25. The method according to claim 24, wherein the instruction to be protected being just after the jump instruction, the non-operative batch is inserted so that the security batch is at an end of the memory area.

26. The method according to claim 24, wherein the security batch being just before the jump instruction, the non-operative batch is inserted so that the instruction to be protected is at a start of the memory area.

27. The method according to claim 2, wherein the security batch preceding the instruction to be protected, and the security batch and the instruction to be protected being on a same side of the jump instruction, the non-operative batch is inserted upstream of the security batch and on the same side of the jump instruction as the security batch.

28. The method according to claim 27, wherein the non-operative batch is inserted so that the instruction to be protected is at an end of the memory area.

29. The method according to claim 1, wherein after insertion of said non-operative batch, there is identified in the memory area at least another instruction to be protected and, to make the another instruction secure, another non-operative batch including another instruction is inserted.

30. The method according to claim 1, wherein before the insertion of said non-operative batch, there is identified in the memory area at least one other instruction to be protected.

31. The method according to claim 1, wherein after making the memory area extending before and after the jump instruction secure, the memory area includes at least 90% of instructions forming parts of inserted non-operative batches.

32. The method according to claim 1, wherein the non-operative batch comprises a plurality of instructions.

33. The method according to claim 1, wherein the non-operative batch comprises at least one ejection instruction to an action program.

34. The method according to claim 1, wherein the non-operative batch comprises at least one ejection instruction to an action subroutine.

35. The method according to claim 33, wherein the action program comprises a security batch including at least one instruction to be executed.

36. The method according to claim 33, wherein the action program comprises instructions for prematurely terminating execution of the program being made secure.

37. The method according to claim 33, wherein the action program comprises instructions for reinitializing the execution of the program being made secure.

38. A method of executing a program made secure against fault attacks, wherein before execution of said program being made secure, a step of making the program secure according to claim 1 is executed.

39. An integrated electronic circuit adapted to execute a method of executing a program made secure against fault attacks according to claim 38.

40. A non-transitory computer readable recording medium with instructions of a computer program recorded thereon for executing a security method according to claim 1 upon said computer program being loaded into and executed by an electronic data processing system.

41. A microcircuit card comprising a means for executing a security method according to claim 1.

42. A device for making a program secure against fault attacks wherein the device comprises:
means for identifying in the program being made secure at least one jump instruction including a relative address chosen from a plurality of possible relative addresses for reaching a target address of the program being made secure in a memory area extending before and after the jump instruction and grouping the plurality of possible relative addresses;
means for identifying, in the program being made secure, an instruction to be protected in the memory area; and
means for inserting in the program be made secure at least one non-operative batch including at least one instruction for making at least the identified instruction secure, the insertion being carried out so that:
the insertion is compatible with keeping the target address of the jump instruction inside the memory area after the insertion,
the insertion is compatible with a normal execution of the program being made secure, after the insertion,
wherein the non-operative batch is inserted into the program being made secure so that a circumvention instruction normally prevents execution of the at least one instruction of the non-operative batch, and an ejection instruction to an action program at the end of the non-operative batch prevents execution of instructions downstream of the non-operative batch, and
wherein the non-operative batch is inserted after a first of said at least one jump instruction or the instruction to be protected.

43. The device according to claim 42, wherein the means for inserting at least one non-operative batch executes the insertion after a first of said at least one jump instruction.

44. The device according to claim 42, further comprising:
means for identifying in the program being made secure a security batch including at least one instruction to be executed; and
means for inserting another non-operative batch, distinct from the non-operative batch, preceding the identified security batch and adapted to favor execution thereof.

45. A microcircuit card comprising an integrated electronic circuit according to claim 42.

46. A data processing system comprising an integrated electronic circuit according to claim 42.

47. A method of making a program secure against fault attacks, comprising:
providing a program to be made secure, including at least one jump instruction including a relative address chosen from a plurality of possible relative addresses for reaching a target instruction of the program being made secure at a target address in a memory area extending before and after that jump instruction and grouping said plurality of possible relative addresses and an instruction to be protected within the memory area;
a step of inserting, in the program to be made secure, at least one non-operative batch including at least one instruction so that:
the insertion is compatible with keeping the target address of the jump instruction inside the memory area after the insertion, and
the insertion is compatible with a normal execution of the program being made secure, after the insertion,
wherein the non-operative batch is inserted into the program to be made secure so that a circumvention instruction normally prevents execution of the at least one instruction of the non-operative batch, and an ejection instruction to an action program at the end of the non-operative batch prevents execution of instructions downstream of the non-operative batch, and wherein the non-operative batch is inserted after a first of said at least one jump instruction or the instruction to be protected.

48. A method of making a program secure against fault attacks, comprising:
provinding a program to be made secure, including at least one jump instruction including a relative address chosen from a plurality of possible relative addresses for reaching a target instruction of the program being made secure at a target address in a memory area extending before and after that jump instruction and grouping said plurality of possible relative addresses and an instruction to be protected preceding the jump instruction within the memory area;
a step of inserting in the program to be made secure at least one non-operative batch including at least one instruction between the instruction to be protected and the jump instruction so that:
insertion is compatible with keeping the target address of the jump instruction inside the memory area after the insertion,
the insertion is compatible with a normal execution of the program being made secure, after the insertion,
wherein the non-operative batch is inserted into the program being made secure so that a circumvention instruction normally prevents execution of the at least one instruction of the non-operative batch, and an ejection instruction to an action program at the end of the non-operative batch prevents execution of instructions downstream of the non-operative batch, and
wherein the non-operative batch is inserted after a first of said at least one jump instruction or the instruction to be protected.

49. A method of making a program secure against fault attacks, comprising:
providing a program to be made secure, including at least one jump instruction including a relative address chosen from a plurality of possible relative addresses for reaching a target instruction of the program being made secure at a target address in a memory area extending before and after that jump instruction and grouping said plurality of possible relative addresses and an instruction to be protected following the jump instruction within the memory area;
a step of inserting, in the program to be made secure, at least one non-operative batch including at least one instruction between the jump instruction and the instruction to be protected, the non-operative batch being configured so as to be executed only in case of disruption of the jump instruction and including at its end an ejection instruction preventing execution of instructions downstream of that non-operative batch, so that:
the insertion is compatible with keeping the target address of the jump instruction inside the memory area after the insertion, and
the insertion is compatible with a normal execution of the program being made secure after the insertion,
wherein the non-operative batch is inserted into the program being made secure so that a circumvention instruction normally prevents execution of the at least one instruction of the non-operative batch, and an ejection instruction to an action program at the end of the non-operative batch prevents execution of instructions downstream of the non-operative batch, and
wherein the non-operative batch is inserted after a first of said at least one jump instruction or the instruction to be protected.

\* \* \* \* \*